US012246533B2

(12) United States Patent
Escudero Gonzalez et al.

(10) Patent No.: US 12,246,533 B2
(45) Date of Patent: Mar. 11, 2025

(54) SINGLE PASS INKJET PRINTER FOR Z-FOLD (FANFOLD) MATERIALS

(71) Applicant: Electronics for Imaging, Inc., Fremont, CA (US)

(72) Inventors: Juan Escudero Gonzalez, Almazora (ES); Elizabeth Logue, Scituate, MA (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 134 days.

(21) Appl. No.: 18/188,383

(22) Filed: Mar. 22, 2023

(65) Prior Publication Data

US 2024/0316959 A1 Sep. 26, 2024

(51) Int. Cl.
*B41J 11/58* (2006.01)
*B41J 11/70* (2006.01)

(52) U.S. Cl.
CPC ................ *B41J 11/58* (2013.01); *B41J 11/70* (2013.01)

(58) Field of Classification Search
CPC .................................. B41J 11/58; B41J 11/70
See application file for complete search history.

(56) References Cited

U.S. PATENT DOCUMENTS

| | | | | |
|---|---|---|---|---|
| 4,803,634 | A | 2/1989 | Ohno et al. | |
| 2017/0341453 | A1* | 11/2017 | Hunkeler | B41J 11/70 |
| 2021/0171311 | A1 | 6/2021 | Pettersson | |
| 2022/0097419 | A1 | 3/2022 | Schuster et al. | |

FOREIGN PATENT DOCUMENTS

| | | | |
|---|---|---|---|
| EP | 2509875 | B1 | 8/2015 |
| WO | 2011072253 | A1 | 6/2011 |
| WO | 2016203343 | A1 | 12/2016 |
| WO | 2022079633 | A1 | 4/2022 |

OTHER PUBLICATIONS

CMC Logistics; CMC An Evolving Partner; retrieved online on Nov. 29, 2022 from url: https://www.cmcmachinery.com/?mailpoet_router&endpoint=view_in_ . . . owser&action=view&data=WzE2LCJjZTRiMWlyNmYwM2YlLDAslilsMTQsMV0, 4 pages.
Highcon Laser Die-Cutting; retrieved online on Nov. 29, 2022 from url: https://highcon.impress1.com/, 5 pages; copyright Impress Communications 2020.
Packaging—CMC Machinery; retrieved online on Nov. 30, 2022 from url: https://www.cmcmachinery.com/?page_id=3304, 4 pages.
Panotec Automation: Automation Systems and Assembly Machines; retrieved online on Nov. 29, 2022 from url: https://www.panotecautomation.com/en, 5 pages.

* cited by examiner

*Primary Examiner* — Bradley W Thies
(74) *Attorney, Agent, or Firm* — Perkins Coie LLP

(57) ABSTRACT

Embodiments of the invention use inkjet printing, which is a non-contact printing system, to print continuously on Z-fold materials without image quality defect. The Z-fold material is created first and the material is then printed (decorated) afterward. Embodiments of the invention print on the flat sheet of Z-fold material prior to being cut, folded, glued, and otherwise formed into a box. Accordingly, a box produced using the invention can have a full coverage print, rather than being printed after box formation, where decoration is limited to one area/surface of the box.

30 Claims, 9 Drawing Sheets

SINGLE PASS INKJET PRINTER FOR Z-FOLD (FANFOLD) MATERIALS

FIELD

Various of the disclosed embodiments concern a single pass inkjet printer for Z-fold (fanfold) materials.

BACKGROUND

Currently, the decoration of the Z-fold (fanfold) materials is performed on a corrugator or roll-to-roll before/during the formation of the Z-fold. Often this is referred to as pre-print. Pre-print can be achieved with analog printing technology such as Gravure or Flexographic. It can also be achieved with inkjet printing in a roll-to-roll format, where the printed material is then mounted on a corrugator to produce a Z-fold. Such pre-print is performed upstream of the box forming process and does not enable a true on-demand printing production. Rather, it limits the print to a repeat pattern. There are companies, such as CMC (https://www.cmcmachinery.com/?page_id=3304), which provide machines that decorate boxes before the cutting, folding, and gluing steps, but the boxes cannot be decorated on demand, nor can the printing design be adjusted to enable 1:1 print or an impactful design for the final customer/product. There are companies that can decorate a box after it is formed and fully erected, but the surface coverage is limited to the top of the box.

Today, the inkjet press can print roll-to-roll materials or sheet-to-sheet, but it is not currently possible to print a Z-fold material in the flat at the point of creation of a box. Z-fold cardboard is a continuous sheet of corrugated cardboard that is accordion folded to stay connected within the framework of infinity. Z-folded sheets, which are found in many types and sizes, provide an ideal solution for companies that want to have right sized boxes, which eliminates the need for overpacking and reduces the corrugated waste. However, no known systems can provide full digital printing on a box at the point of creation and distribution.

SUMMARY

Due to the problems presented by the fold in Z-fold materials current decoration workflows print with pre-print technology before the creation of the fold. Embodiments of the invention use inkjet printing. Because inkjet printing is a non-contact printing system embodiments of the invention print continuously on Z-fold materials without image quality defect. Accordingly, the workflow is different from current practice in that the Z-fold material is created first and the material is then printed (decorated) afterward. Embodiments of the invention print on the flat sheet of Z-fold material prior to its being die cut, folded, glued, and otherwise formed into a box. Accordingly, a box produced using the invention can have a full coverage print, rather than being printed after box formation, where decoration is limited to one area/surface of the box.

DETAILED DESCRIPTION

Embodiments of the invention use inkjet printing, which is a non-contact printing system, to print continuously on Z-fold materials without image quality defect. This allows printing from a Z-fold web instantly without waiting on set up, plates, or die cutting. Thus, the Z-fold material is created first and the material is then printed (decorated) afterward. Embodiments of the invention print on the flat sheet of Z-fold material prior to being die cut, folded, glued, and otherwise formed into a box. Accordingly, a box produced using the invention can have a full coverage print, rather than being printed after box formation, where decoration is limited to one area/surface of the box.

Figure 1:
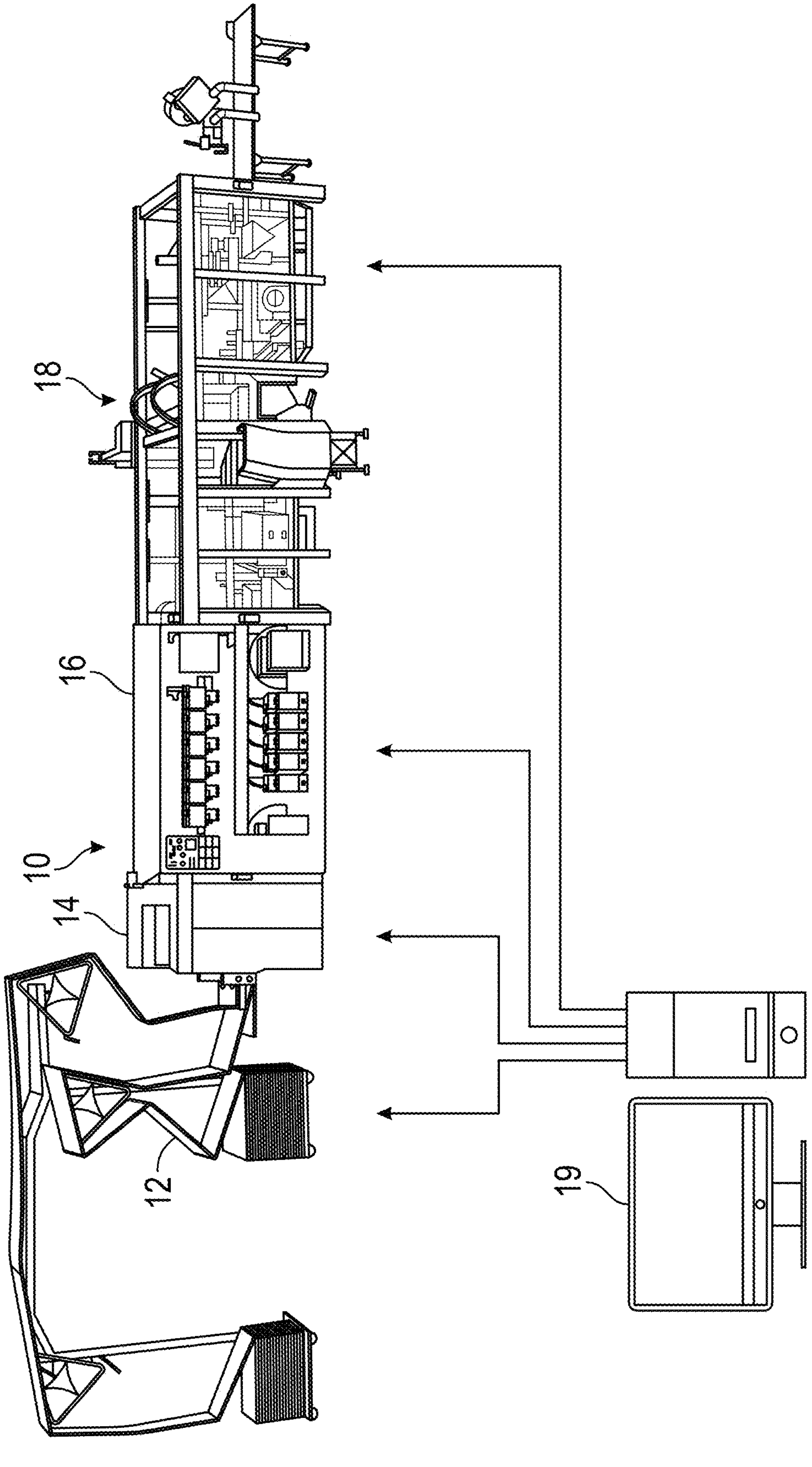
FIG. 1 shows a single pass inkjet printer for Z-fold (fanfold) materials according to an embodiment of the invention.

FIG. 1 shows a single pass inkjet printer 10 for Z-fold (fanfold) materials according to an embodiment of the invention. In FIG. 1, the printer 10 comprises a feeder 12 that provides a continuous web of Z-fold sheet material to a cutting machine 14. The cutting machine cuts the sheet to a desired length for a particular sized box to be produced. The length of the sheet defines the circumference of a box to be produced by the printer and the width of the sheet defines the height of the box to be produced by the printer.

The cut sheet is fed to a single pass inkjet printer 16. An image for the entire box to be formed is printed on the sheet. The sheet is then passed to a die cutting, folding, and gluing machine 18 where the sheet is cut to the outline of the desired box when the box is flat before folding and gluing. The die cut sheet is then folded and glued, resulting in a complete box.

Unique to the invention is the fact that the printer can be programmed. The feeder, cutting machine, inkjet printer, and die cutting, folding, gluing elements of the overall printer are controlled in a coordinated fashion by a processor 19. The processor can be programmed to operate the printer to feed the Z-fold material along a printer path, cut the Z-fold material to a desired length, image the cut material, and then die cut, fold, and glue the imaged sheet to form a box. Uniquely, the entire production of the box is performed as a single set of continuous operations such that any number of boxes of any desired shape and bearing any desired design can be formed on-demand. The processor thus provides control signals to each element of the box manufacture workflow and receives status signals from each element of the box manufacture workflow to assure that each element of the workflow functions in a coordinated fashion with each other element of the workflow.

Images can be resized in real time to match the size of the box to be produced. For example, a fulfillment center may be packing an order for tennis shoes and a water bottle. The system determines in real time what size box is needed to pack the order, feeds the Z-fold material to a cutting machine which then cuts the Z-fold material to a sheet of an appropriate size. In this example, each order may require a different sized box. Thus, the printer cuts the sheet to an appropriate length for each of the different sized boxes.

While the order for tennis shoes and a water bottle relates to sporting equipment, the next order to be packed might relate to books and music. As such, the processing system controls the inkjet printer to print a different image on each box, where the image is appropriate for the contents of the box. For example, the box for the tennis shoes and water bottle may depict a sporting scene and the box for the books and music might depict a music concert or scene from one of the books in the order.

The processing unit can add targeted advertisements to the image printed on the box, for example that are personalized to the recipient based on the recipient's profile and that are also consistent with the contents of the box. For example, the order for tennis shoes and a water bottle might include a promotion for a sports drink based on the type of product packed into the box and also based on the recipient's prior purchase history.

The processing unit then operates the printer to die cut, fold, and glue the box. As such, a custom box is prepared for each order on-demand. Die cutting may differ not only the size of the box produced but also in the features of the box. For example, in some cases the box might feature scalloped edges or tear portions that allow the box to be opened easily.

In other embodiments, a series of boxes of different sizes and having different imaging may be produced. For example, a manufacturer may want to package 100 sets of headphones, 50 amplifiers, and 250 spools of cable. The processing system is programmed to produce the desired boxes for these products in the desired number, each box featuring an appropriate design for the product it is to contain.

Figure 2:
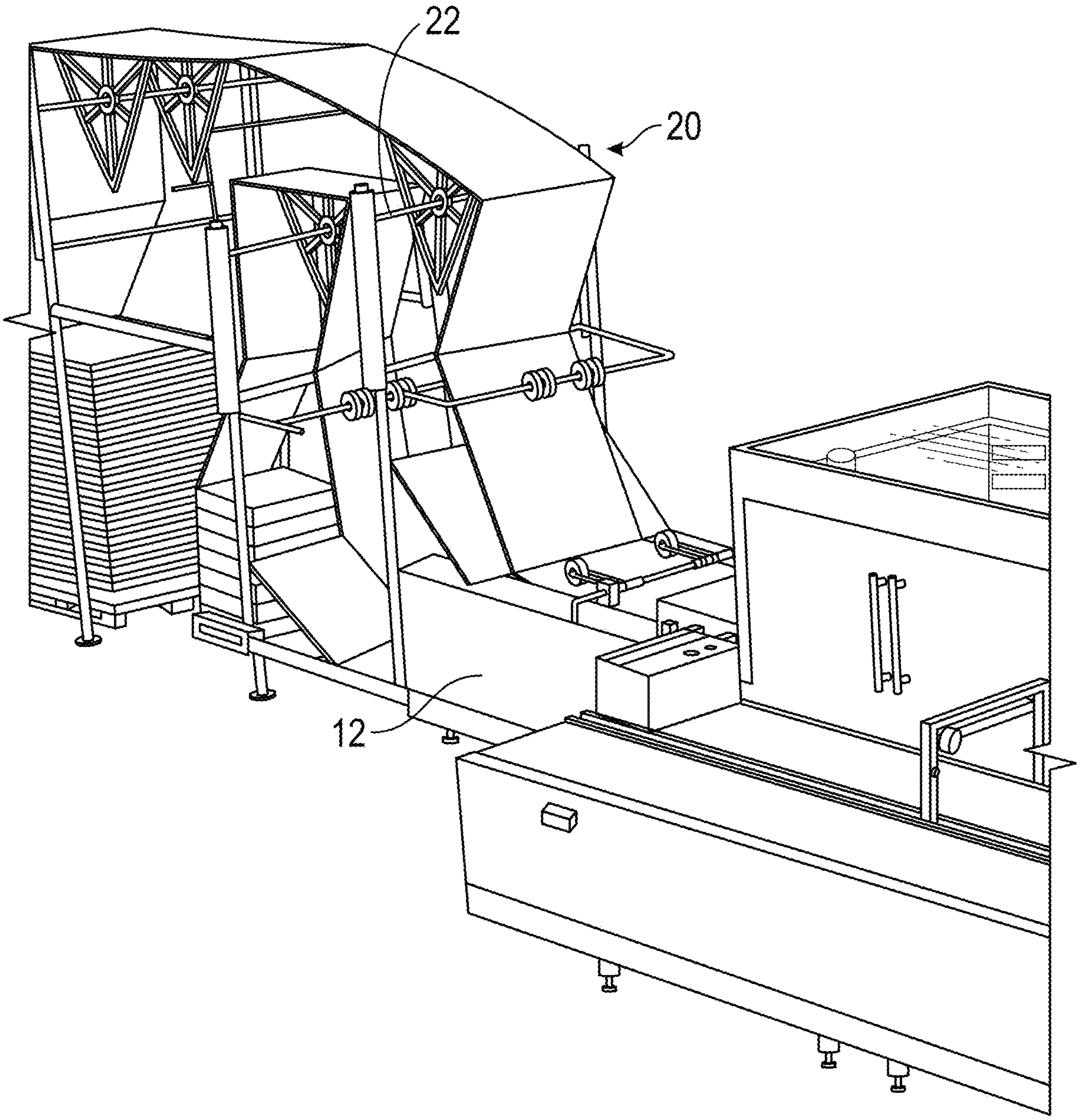
FIG. 2 shows a source of Z-fold material in line with a single pass inkjet printer for Z-fold (fanfold) materials according to an embodiment of the invention.

FIG. 2 shows a source of Z-fold material 12 in line with a single pass inkjet printer for Z-fold (fanfold) materials according to an embodiment of the invention. In the example of FIG. 2, multiple sources of Z-fold material 20, 22 are shown.

Figure 3:
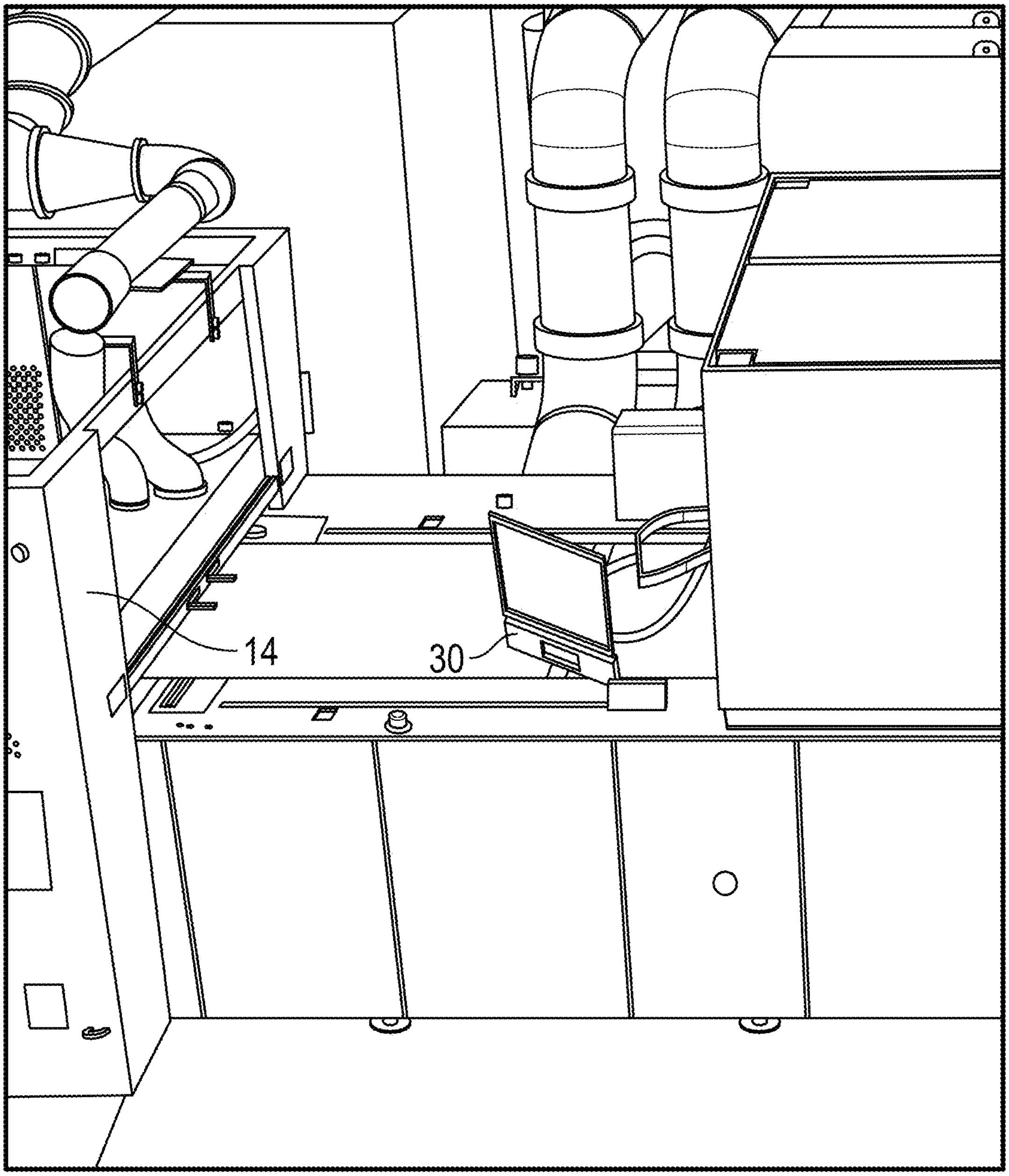
FIG. 3 shows a Z-fold material being fed into a single pass inkjet printer for Z-fold (fanfold) materials according to an embodiment of the invention.

FIG. 3 shows a Z-fold material being fed into a single pass inkjet printer for Z-fold (fanfold) materials according to an embodiment of the invention. As shown in FIG. 3, the Z-fold material is cut to sheets 30 of a desired length by the cutting machine 14. Existing feeding and cutting machines may be adapted for feeding and cutting Z-fold materials in embodiments of the invention.

Figure 4:
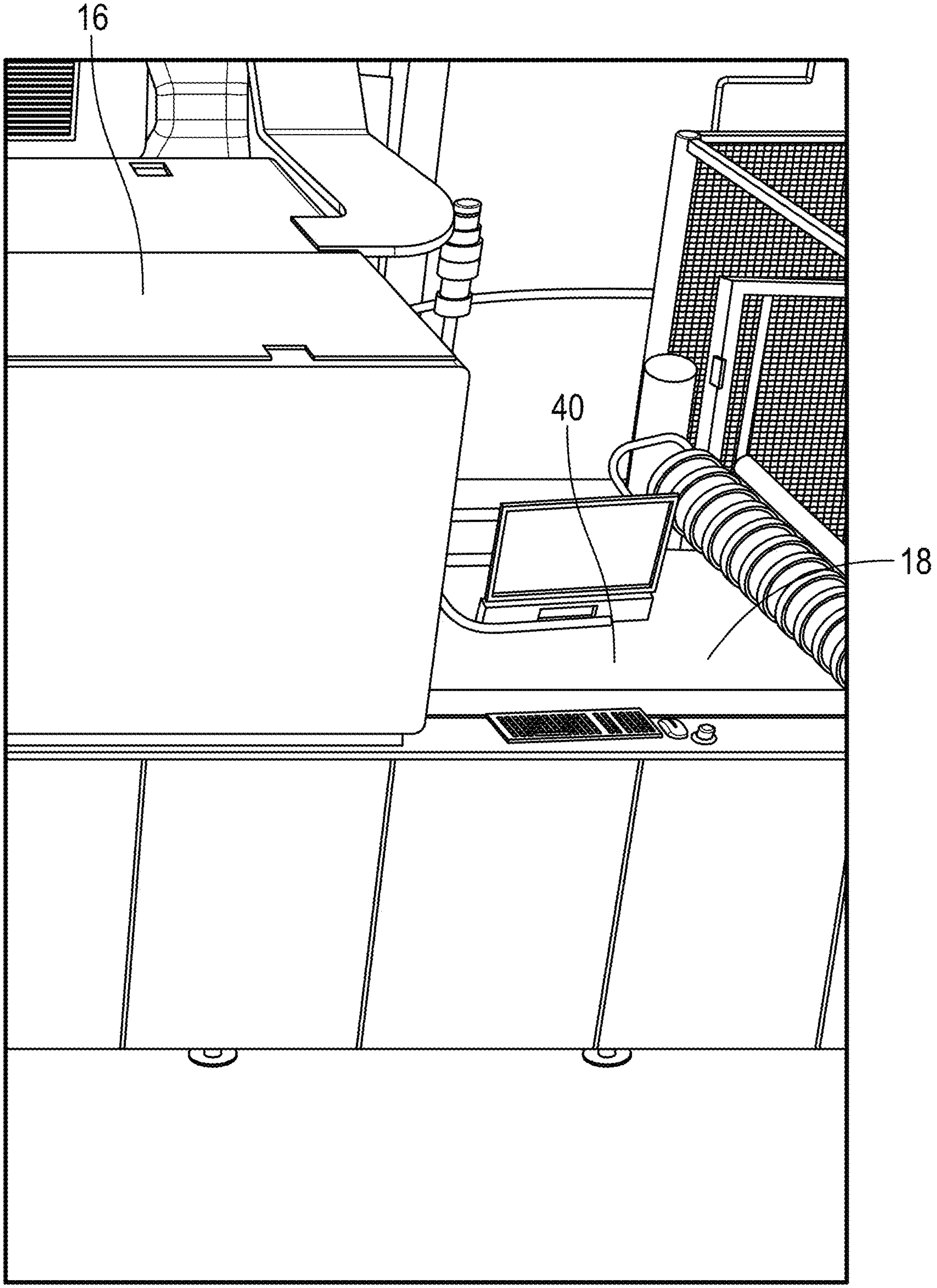
FIG. 4 shows a printed Z-fold material exiting a single pass inkjet printer for Z-fold (fanfold) materials according to an embodiment of the invention.

FIG. 4 shows a printed Z-fold material exiting a single pass inkjet printer for Z-fold (fanfold) materials according to an embodiment of the invention. In FIG. 4, the inkjet printer 16 prints on image on the cut sheet 40. The printed cut sheet is then routed along the print path to the die cutting, folding, and gluing machine 18. Exemplary die cutting, folding, and gluing machines are manufactured by Highcon (https://www.highcon.net/).

Figure 5:
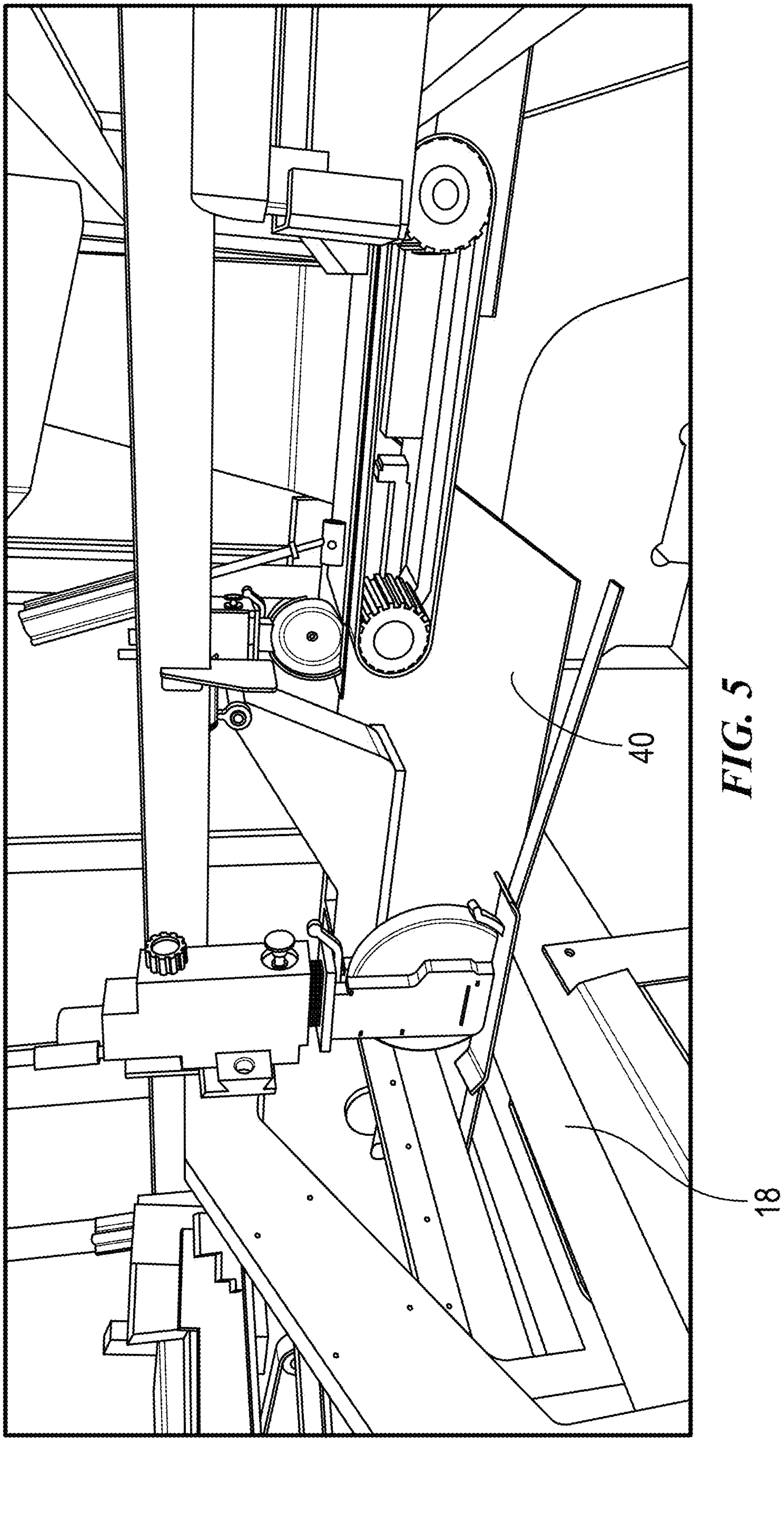
FIG. 5 shows a printed Z-fold material being fed into a cutting tool according to an embodiment of the invention.

FIG. 5 shows a printed Z-fold material being fed into the folding, cutting, and gluing machine according to an embodiment of the invention. In FIG. 5, the printed cut sheet 40 shown as it is routed along the print path to the die cutting, folding, gluing machine 18.

Figure 6:
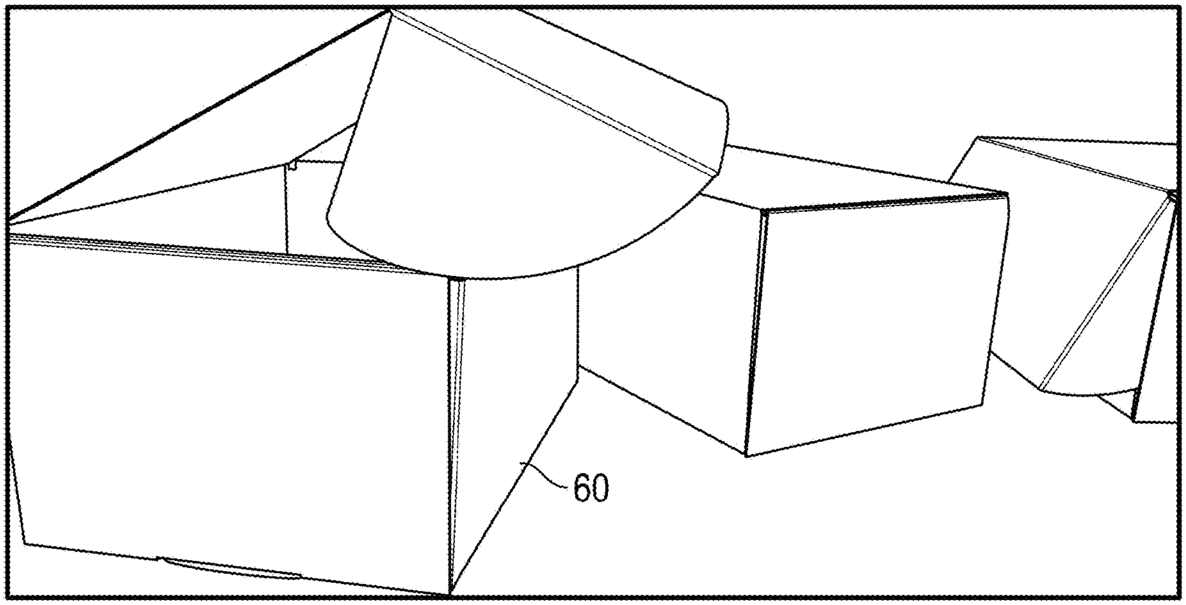
FIG. 6 shows a printed, folded, and glued box exiting a folding and gluing tool according to an embodiment of the invention.

FIG. 6 shows a printed, folded, and glued box 60 exiting a folding and gluing tool according to an embodiment of the invention. Uniquely, the printer provides real time on-demand box production that incorporates all steps of box production into a single workflow, where each box of series of boxes produced is custom cut, printed, die cut, folded, and glued.

Planarity Detection

A Z-fold sheet is not flat at the point of the fold. Rather, the sheet bows at the fold. Because the printer cuts sheets from the web of Z-fold material at varying and lengths as specified by the box to be produced, at any time some sheets may not have a fold, some sheets may have a fold near the center of the sheet, and still other sheets may have a fold near an edge of the sheet. A standard inkjet printer would not be able to print faithfully because the distance of the sheet from the inkjet printheads varies as the sheet moves along the print path due to the bowing of the sheet caused by the fold. Due to the nature of Z-fold material the boing may present itself as a concavity or as a convexity. This is due to the alternate folds in the Z-fold web. The bowing of the sheet at the fold runs the risk of collision of the bowed portion of the sheet with the delicate and expensive printheads and can therefore damage the printer. Embodiments of the invention provide an inkjet printer that addresses this issue by providing a strong vacuum on the print bed to firmly draw the sheet downward into a planar alignment with the printheads.

In embodiments of the invention, the vacuum can achieve a hold down force of 2000 gr versus 300 gr which is typical, for example for HP printers. This level of vacuum allows the printer to flatten Z-fold materials. In embodiments of the invention, the vacuum is adjustable. A setpoint of pressure is fixed, for example 500 gr, and the system, depending on the substrate quality, controls the vacuum source's blower to adjust the vacuum to the setpoint. A sensor detects the bow of each sheet to be printed by the printer and an indication is provided to the printer operators as appropriate to increase the vacuum due to a warp, bow, or defect of the sheet. Additionally, the system can adjust the vacuum system area to the substrate (see U.S. Pat. No. 11,407,238) and control the air below the system to reduce the artifacts and increase Image quality (see U.S. Pat. No. 10,913,294).

Figure 7A:
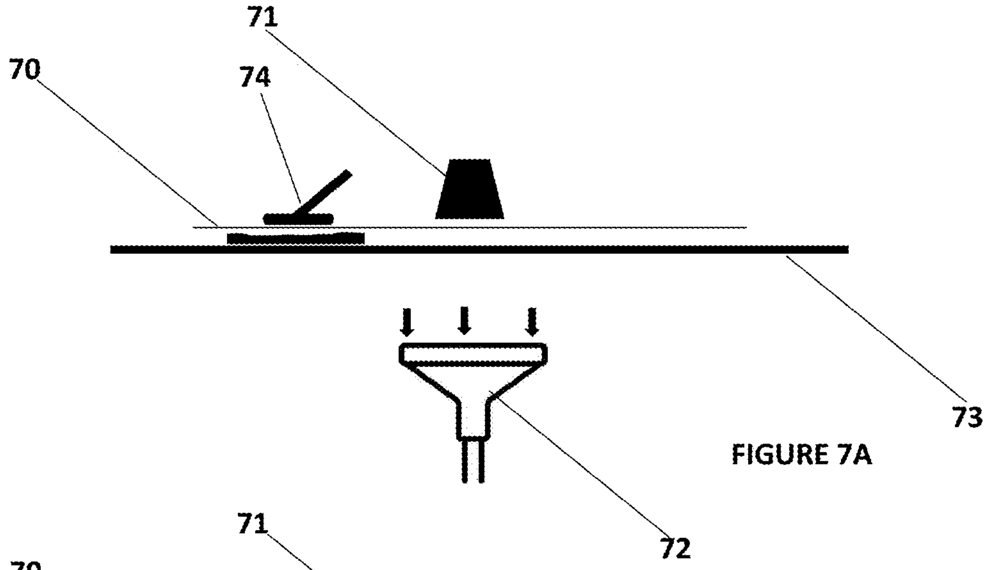
FIGS. 7A-7C show a system for sheet planarity detection according to an embodiment of the invention.
Figure 7B:
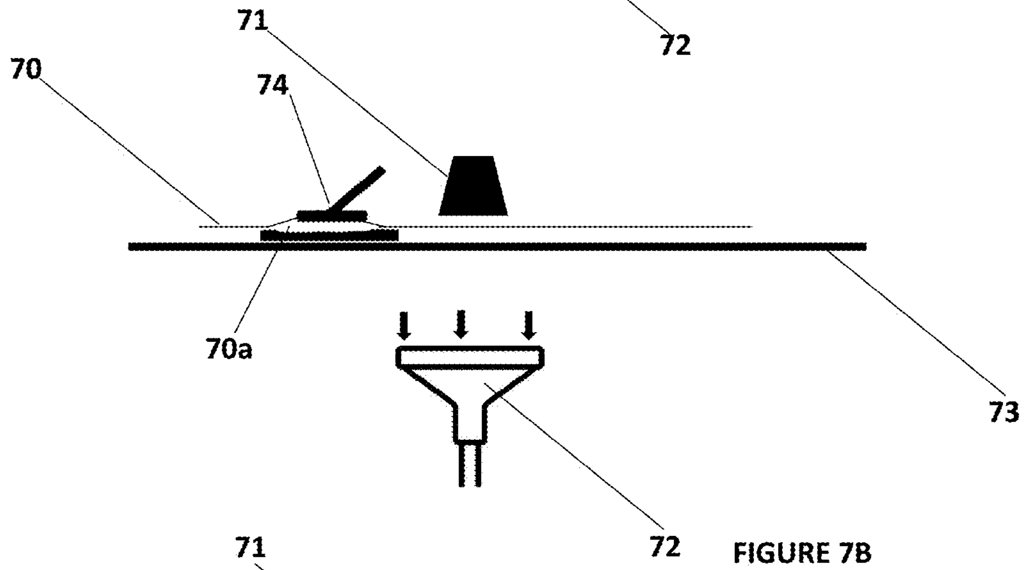
Figure 7C:
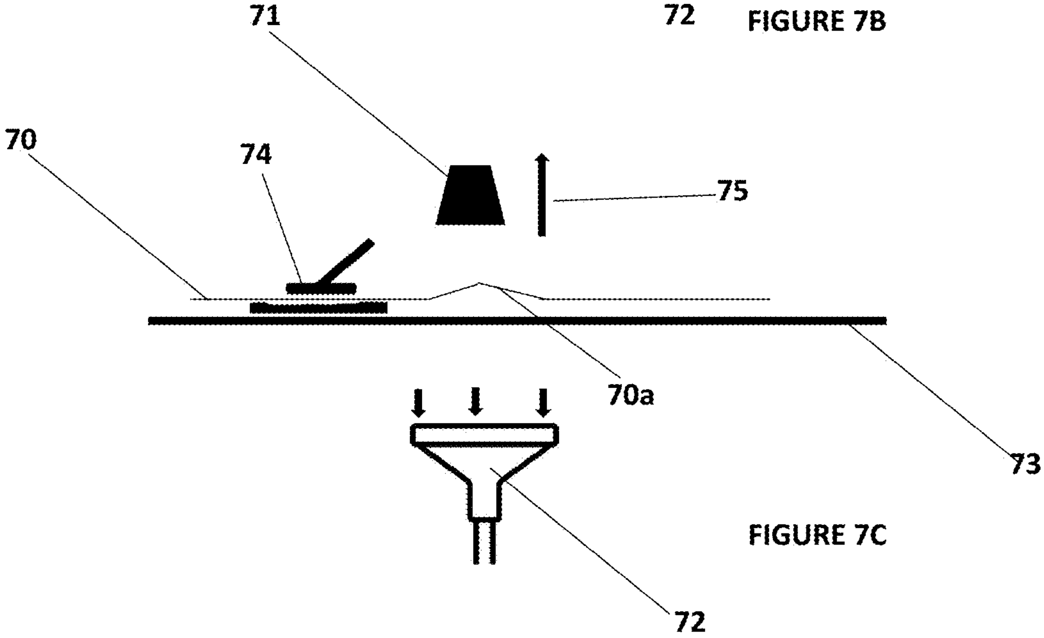

FIGS. 7A-7C show a system for sheet planarity detection according to the invention. As shown in FIGS. 7A-7C a strong vacuum 72 is applied to the underside of the sheet 70 to draw it into planar alignment with the printer bed 73. The vacuum, in most cases, can maintain adequate planarity of the sheet to allow acceptable imaging on the sheet by the printer. However, the sheet delivered to the printer from the feeder/cutter is not always cut with the fold in a central portion of the sheet. In some cases, the sheet may have the fold near an edge of the sheet. In such cases it may not be possible to apply sufficient vacuum to the sheet to maintain the planarity required for acceptable printing. Also, the sheet may bow up sufficiently at the crease **70*a* (FIGS. 7B, 7C) in the sheet where the sheet was folded such that the bowed portion of the sheet may collide with the print heads 71** resulting in costly damage to the printer.

Embodiments of the invention also provide a sheet height tracking facility 74. In embodiments of the invention, the height tracking facility comprises a light detection system such as the HL-G125 laser displacement sensor manufactured by Panasonic. The height tracking facility adjusts the spacing of the printheads from the sheet in real time to accommodate the lack of planarity of the sheet. The height tracking facility detects the height of the sheet at the Z-fold. This height is used to determine when to operate a printhead lifting system to adjust printhead height. In embodiments, upon detecting a bowed portion of the sheet the print heads are raised 75 (FIG. 7C) sufficiently to avoid collision with the sheet. The print heads may still operate but the act of raising the print heads is noted in the system and the sheet with an unacceptable bow is marked in the system for discard rather than being counted as part of production output. In a first embodiment of the invention, when the printer prints over a threshold deviance from planar, e.g. 5.5 mm of the sheet thickness, the sheet is tracked and directed for discard in a reject line. Accordingly, in this embodiment of the invention, the system can operate and continue printing up to a threshold sheet deviance, e.g. 5.5 mm, due to sheet defects, such as warp or bowing due to the Z-fold crease. In a second embodiment of the invention, an inspection system detects when the print quality is not acceptable and the sheet is then discarded in reject line. In such case, the box that was to be printed on the rejected sheet is printed again on another sheet to meet production requirements.

In other embodiments, the print heads are continuously raised and lowered to track the profile of the sheet and thus print an acceptable image on the sheet so long as the extent of print head excursion is within a predetermined tolerance.

System Architecture

Figure 8:
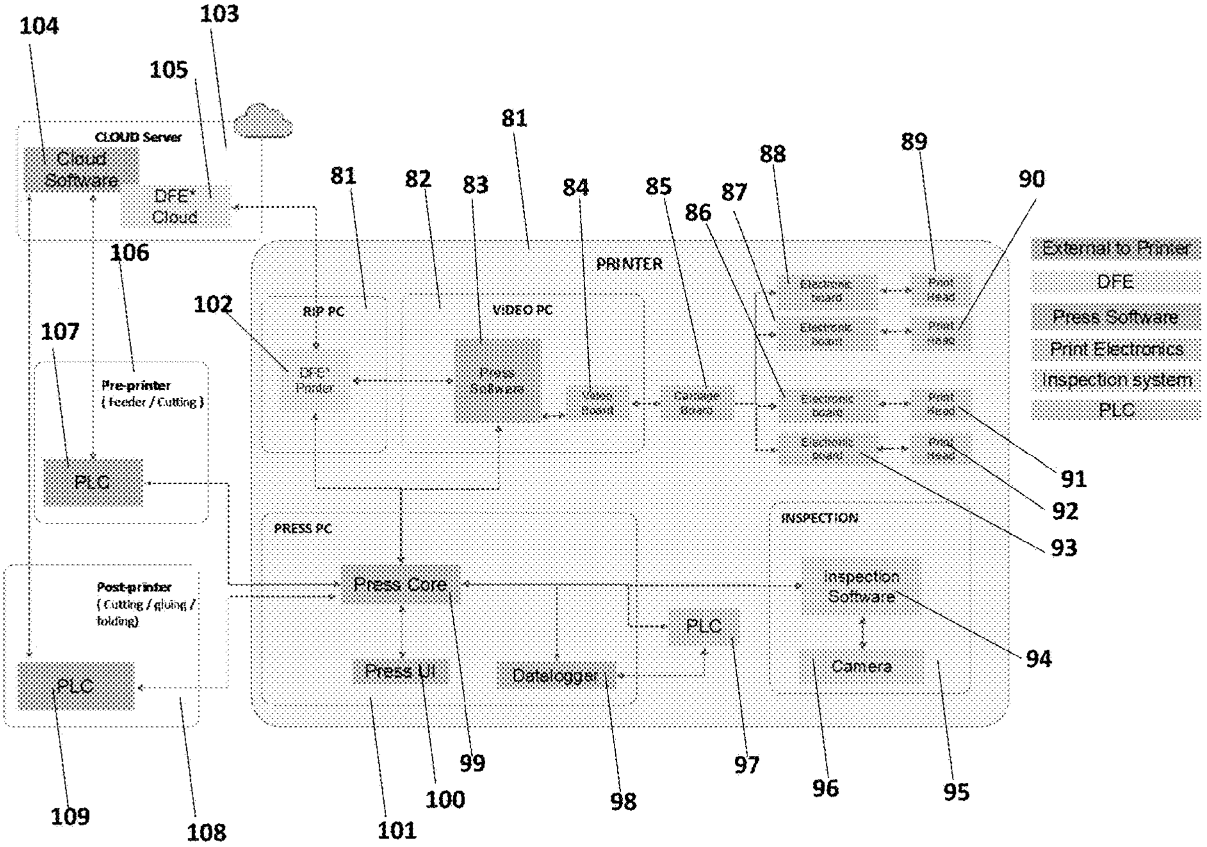
FIG. 8 is a block diagram showing a system architecture according to the invention.

FIG. 8 is a block diagram showing a system architecture according to the invention. In FIG. 8, a printing system for Z-fold sheets includes a printer 81, pre-printer for sheet feeding and cutting 106, and post printer for die cutting, folding, and gluing 108, each of which is communicatively interconnected via a cloud server 103. The pre-printer and post-printer each includes a respective programmable logic controller (PLC) 107, 109. The cloud server includes cloud software 104 and a cloud digital front end (DFE) 105. The pre-printer and post-printer PLCs and cloud software are all external to the printer.

The printer includes a raster image processor (RIP) 81 that provides a DFE for the printer 102 that is in communication with the cloud DFE. The printer also includes a video PC 82 that provides press software 83 and a video board 84. The press software is in communication with the DFE for the printer and with the press core 99 within a press PC101. In turn, the press core is in communication with a press UI 100 and datalogger 98. The press software thus collectively the DFE for the printer, press core, press UI, and datalogger. The press core and datalogger are in communication with a printer PLC 97.

The printer includes a carriage board 85 that receives data from the video board in the video PC. The carriage board provides operating instructions to an electronic board 88 that operates a print head 89, an electronic board 87 that operates a print head 90, an electronic board 86 that operates a print head 91, and an electronic board 93 that operates a print head 92. Those skilled in the art will appreciate that any number of print heads may be provided as desired along with corresponding electronic boards.

The press core also communicates with an inspection system 95 (see FIG. 7) that includes in a camera 96 in an embodiment of the invention and inspection software 94.

Operation of the printer, pre-printer, and post-printer are coordinated via interaction of the pre-printer and post-printer PLCs with the printer press core 99. Further, in coordination with cloud and printer DFEs the system allows the production of individual boxes in real-time, as discussed above. In embodiments of the invention the system resizes the original print file to adapt to a customized box, where each box is different. The system adapts the file (picture) to each box, to keep the logos, bar codes, etc. such that the dimensions of all print elements are appropriate for the box. Some print elements, such as bare codes, may need to be maintained at a certain minimum or maximum size, while other print elements may be scaled as much as necessary to cover the box with printed matter as appropriate for the box. In such cases, the composition of the images to be printed on the box may also be adjusted to allow for a chance in the relative size of the various print elements.

Processing System

Figure 9:
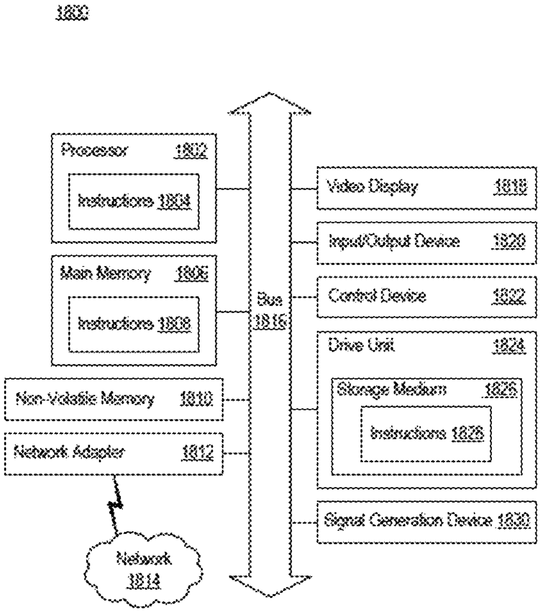
FIG. 9 is a block diagram illustrating an example of a processing system in which at least some operations described herein can be implemented.

FIG. 9 is a block diagram illustrating an example of a processing system 1800 in which at least some operations described herein can be implemented. For example, components of the processing system 1800 may be hosted on a computing device that includes a threat detection platform. As another example, components of the processing system 1800 may be hosted on a computing device that is queried by a threat detection platform to acquire emails, data, etc.

The processing system 1800 may include a central processing unit (also referred to as a "processor") 1802, main memory 1806, non-volatile memory 181810, network adapter 1812 (e.g., a network interface), video display 1818, input/output device 1820, control device 1822 (e.g., a keyboard or pointing device), drive unit 1824 including a storage medium 1826, and signal generation device 1830 that are communicatively connected to a bus 1816. The bus 1816 is illustrated as an abstraction that represents one or more physical buses or point-to-point connections that are connected by appropriate bridges, adapters, or controllers. The bus 1816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

The processing system 1800 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1800.

While the main memory 1806, non-volatile memory 181810, and storage medium 1826 are shown to be a single medium, the terms "machine-readable medium" and "storage medium" should be taken to include a single medium or multiple media (e.g., a centralized/distributed database and/or associated caches and servers) that store one or more sets of instructions 1828. The terms "machine-readable medium" and "storage medium" shall also be taken to include any medium that is capable of storing, encoding, or carrying a set of instructions for execution by the processing system 1800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1804, 1808, 1828) set at various times in various memory and storage devices in an electronic device. When read and executed by the processors 1802, the instruction(s) cause the processing system 1800 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 181810, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1812 enables the processing system 1800 to mediate data in a network 1814 with an entity that is external to the processing system 1800 through any communication protocol supported by the processing system 1800 and the external entity. The network adapter 1812 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 1812 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A system, comprising:

a feeder configured to feed a continuous sheet;

a cutting machine configured to receive the sheet from the feeder and to cut said sheet to a predetermined length;

a single pass inkjet printer configured to receive the cut sheet from the cutting machine, said single pass inkjet printer configured to print an image on said cut sheet to decorate a box to be formed from said cut sheet; and a box machine configured to receive said printed sheet from said single pass inkjet printer, said box machine configured for die cutting said printed sheet to an outline of a desired box when the box is flat and unfolded, folding said printed sheet into a desired box shape, and gluing said folded sheet to complete a box.

2. The system of claim 1, said continuous sheet comprising a continuous web of Z-fold material.

3. The system of claim 1, wherein the sheet length defines the circumference of a box to be produced by the printer and the sheet width defines the height of the box to be produced by the printer.

4. The system of claim 1, further comprising:

a processor configured for receiving in real time instructions for controlling operation of the feeder, cutting machine, single pass inkjet printer, and box machine in a coordinated fashion and operating the system in an uninterrupted sequence to feed the continuous sheet along a printer path, cut the continuous sheet to a desired length, print an image on the cut sheet, and then die cut, fold, and glue the imaged sheet to form a box;

wherein production of the box is performed as a single set of continuous operations; and wherein any desired number of boxes of any desired shape and bearing any desired design are formed on-demand.

5. The system of claim 1, further comprising:

said processor configured for resizing said images in real time to match a size of the box to be produced.

6. The system of claim 1, further comprising:

said processor configured for controlling the inkjet printer to print a selected image on each box, where said selected image is customized for the box contents.

7. The system of claim 1, further comprising:

said processor configured for adding targeted advertisements to the image printed on the box that are personalized to the box recipient and/or complementary to the box contents.

8. The system of claim 1, said single pass inkjet printer further comprising:

a print bed configured for supporting said sheet during printing, said print bed securing said sheet thereto during printing by application of a strong vacuum to the sheet to firmly draw the sheet downward into a planar alignment with the print bed.

9. The system of claim 8, further comprising:

a sheet height tracking facility configured for adjusting spacing of the single pass inkjet printer print heads from the sheet in real time to accommodate the lack of planarity of the sheet when said vacuum is not adequate to secure the sheet to the print bed to maintain acceptable sheet planarity during printing.

10. The system of claim 9, wherein upon detecting a bowed portion of the sheet, the sheet height tracking facility raises the print heads sufficiently to avoid collision of the sheet with the print heads.

11. The system of claim 10, wherein upon raising the print heads, the sheet lacking acceptable planarity is marked for discard.

12. The system of claim 9, further comprising:

a mechanism configured for continuously raising and lowering the single pass inkjet printer print heads to track the sheet planarity.

13. A printer, comprising:

a single pass inkjet printer configured to receive cut sheets from a continuous web of Z-fold material, said single pass inkjet printer configured to print an image on said cut sheet to decorate a box to be formed from said cut sheet, wherein the cut sheet bows at a Z-fold crease; and a print bed configured for supporting said sheet during printing, said print bed securing said sheet thereto during printing by application of a strong vacuum to the sheet to firmly draw the sheet downward into a planar alignment with the print bed at the Z-fold crease.

14. The printer of claim 13, further comprising:

a sheet height tracking facility configured for adjusting spacing of the single pass inkjet printer print heads from the sheet in real time to accommodate the lack of planarity of the sheet when it is not possible to apply sufficient vacuum to the sheet via the print bed to maintain acceptable sheet planarity at the Z-fold crease.

15. The printer of claim 14, wherein upon detecting a significantly bowed portion of the sheet, the sheet height tracking facility raises the print heads to avoid collision of the print heads with the sheet.

16. The printer of claim 15, wherein upon raising the print heads, the sheet lacking acceptable planarity is marked for discard.

17. The printer of claim 14, further comprising:

a mechanism configured for continuously raising and lowering the single pass inkjet printer print heads to track a lack of sheet planarity at the Z-fold crease.

18. A method, comprising:

a cutting machine receiving a continuous sheet from a feeder and cutting said sheet to a predetermined length;

a single pass inkjet printer receiving the cut sheet from the cutting machine, said single pass inkjet printer printing an image on said cut sheet to decorate a box to be formed from said cut sheet; and a box machine receiving said printed sheet from said single pass inkjet printer, said box machine die cutting said printed sheet to an outline of a desired box when the box is flat and unfolded, folding said printed sheet into a box shape, and gluing said folded sheet to complete a box.

19. The method of claim 18, said continuous sheet comprising a continuous web of Z-fold material.

20. The method of claim 18, wherein the sheet length defines the circumference of a box to be produced by the printer and the sheet width defines the height of the box to be produced by the printer.

21. The method of claim 18, further comprising:

a processor receiving in real time instructions for controlling operation of the feeder, cutting machine, single pass inkjet printer, and box machine in a coordinated fashion and operating the system in an uninterrupted sequence to feed the continuous sheet along a printer path, cut the continuous sheet to a desired length, print an image on the cut sheet, and then die cut, fold, and glue the imaged sheet to form a box;

wherein production of the box is performed as a single set of continuous operations; and wherein any desired number of boxes of any desired shape and bearing any desired design are formed on-demand.

22. The method of claim 18, further comprising:

said processor resizing said images in real time to match a size of the box to be produced.

23. The method of claim 18, further comprising:

said processor controlling the inkjet printer to print a selected image on each box, where said selected image is customized for the box contents.

24. The method of claim 18, further comprising:

said processor adding targeted advertisements to the image printed on the box that are personalized to the box recipient and consistent with the box contents.

25. The method of claim 18, said single pass inkjet printer further comprising:

providing a print bed for supporting said sheet during printing, said print bed securing said sheet thereto during printing by application of a strong vacuum to the sheet to firmly draw the sheet downward into a planar alignment with the print bed.

26. The method of claim 25, further comprising:

providing a sheet height tracking facility for adjusting spacing of the single pass inkjet printer print heads from the sheet in real time to accommodate the lack of planarity of the sheet when the vacuum applied to the sheet via the print bed is not adequate to maintain acceptable sheet planarity.

27. The method of claim 26, further comprising:

upon detecting a bowed portion of the sheet, the sheet height tracking facility raising the print heads sufficiently to avoid collision of the sheet with the print heads.

28. The method of claim 27, further comprising:

upon raising the print heads, marking the sheet lacking acceptable planarity for discard.

29. The method of claim 26, further comprising:

continuously raising and lowering the single pass inkjet printer print heads to track sheet planarity.

30. A method for printing continuously on a continuous sheet of Z-fold material without image quality defect, comprising in sequence and without interruption:

a processor receiving in real time instructions for controlling operation of a feeder, cutting machine, single pass inkjet printer, and box machine in a coordinated fashion and operating said feeder, cutting machine, single pass inkjet printer, and box machine in an uninterrupted sequence to feed the continuous sheet of Z-fold material along a printer path, cut the continuous sheet to a desired length, print an image on the cut sheet, and then die cut, fold, and glue the imaged sheet to form a box, wherein production of the box is performed as a single set of continuous operations, and wherein any desired number of boxes of any desired shape and bearing any desired design are formed on-demand; and the processor providing instructions to the feeder, cutting machine, single pass inkjet printer, and box machine for:

feeding said Z-fold material to the cutting machine;

cutting said Z-fold material;

receiving said cut Z-fold material at the single pass inkjet printer;

printing on said cut Z-fold material;

during printing applying a strong vacuum to the cut Z-fold material to firmly draw the sheet downward into a planar alignment with a print bed;

using a sheet height tracking facility to adjust spacing of the single pass inkjet printer print heads from the sheet in real time to accommodate a lack of planarity of the sheet when the vacuum applied to the sheet via the print bed is not adequate to maintain acceptable sheet planarity; and providing the cut and printed Z-fold material to the box machine for die cutting, folding, and gluing to form a completed box.

* * * * *